UNITED STATES PATENT OFFICE.

OLIVER P. WILHELM, OF MICHIGAN CITY, INDIANA, ASSIGNOR TO HIMSELF, LANE WILHELM, AND SANTFORD WILHELM, OF MICHIGAN CITY, INDIANA.

AIR-BRAKE COUPLING.

1,041,391. Specification of Letters Patent. Patented Oct. 15, 1912.

Application filed October 24, 1910. Serial No. 588,677.

*To all whom it may concern:*

Be it known that I, OLIVER P. WILHELM, a citizen of the United States, residing at Michigan City, in the county of Laporte and State of Indiana, have invented certain new and useful Improvements in Air-Brake Couplings; and I do hereby declare the following to be a full, clear, and exact description of the invention, such as will enable others skilled in the art to which it appertains to make and use the same.

This invention relates to improvements in hose couplers particularly adapted for use in connection with air brakes, the object being to provide a hose coupling which is safe, durable and efficient, and consists in the features of construction and the combinations of parts hereinafter fully described and claimed.

The present invention relates more particularly to certain new and useful improvements in the details of construction of the hose coupling shown and described in my application for Letters Patent Serial No. 516,489 filed September 7, 1909.

One of the particular objects of my present invention is to provide means whereby when the two members of the coupler are moved relatively into coupled position the valve or valves contained therein will be opened even though certain parts of the coupler shall have suffered injury.

A further particular object of the present invention is to provide means whereby in the event of the breaking of the spring or springs maintaining the valves on their seats the said valve or valves cannot leave their seats to an extent sufficient to cause leakage of such an extent as to interfere with the running of the train.

Another object of the invention is to provide means for preventing the valve from being so tightly seated as to interfere with its operation.

Other objects of the invention will be ascertained from the following description.

In the accompanying drawings illustrating the invention: Figure —1— is a side elevation showing two coupler heads constructed in accordance with my invention disposed in coupled relation. Fig. —2— is a plan view showing two coupling members coupled in the position in which the respective valves thereof are open. Fig. —3— is a view similar to Fig. —1— showing the respective coupler heads moved to the other limits of their relative movement preparatory to uncoupling the same. Fig. —4— is a central sectional view on the line 4—4 of Fig. —1— showing the coupler heads in coupled position. Fig. —5— is a fragmentary plan view of the outer end of one of the coupler heads, the cap covering said end being removed. Fig. —6— is a fragmentary detail section on an enlarged scale on the line 6—6 of Fig. —4—. Fig. —7— is a fragmentary detail section on the line 7—7 of Fig. —3—.

The said coupler head herein illustrated and described is capable of being used in connection with the air brake hose couplers at present employed on practically all railroad cars in North America, as shown in detail in my aforesaid previous application of September 7, 1909; it being deemed superfluous to repeat said illustration herein. The coupler head forming subject of this application is identical in practically all respects with that illustrated and described in my previous application; the particular changes and improvements constituting the present invention relating to certain details of construction which will be hereinafter particularly pointed out.

As the two coupler heads shown are identical in construction the description of one thereof will suffice.

The coupler head consists of a valve casing 1 equipped with a hollow stem 2 and provided with a tapered opening 3 in which the valve 4 seats. The latter is slightly conical or like a truncated cone, its circumferential wall being tapered to fit said opening 3. Spanning said opening 3 at its smaller end is a removable bar 5 provided with a central opening through which the stem 6 of the valve 4 projects; the latter being threaded and adapted to receive the nut 7 on its free end. The said bar 5 is provided with an annular flange 8 concentric with the opening therein and forming a cylindrical pocket in which the spring 9 is received. The latter bears at one end upon the bottom wall of said pocket and at its other end upon the washer 10 disposed on the valve stem 6; the said washer being of greater diameter than

UNITED STATES PATENT OFFICE.

CHARLES I. WILLIAMS, OF UTICA, NEW YORK.

HEADLIGHT.

1,041,392.

Specification of Letters Patent.

Patented Oct. 15, 1912.

Original application filed April 1, 1911, Serial No. 618,475. Divided and this application filed December 26, 1911. Serial No. 667,631.

*To all whom it may concern:*

Be it known that I, CHARLES I. WILLIAMS, a citizen of the United States, residing at Utica, in the county of Oneida and State of New York, have invented a certain new and useful Improvement in Headlights, of which the following is a specification, reference being had therein to the accompanying drawing.

My invention relates to an improved headlight, and I declare that the following is a full, clear, concise and exact description thereof, sufficient to enable one skilled in the art to make and use the same, reference being had to the accompanying drawings in which like reference characters refer to like parts throughout.

The invention includes several features, relating to a case which contains the interior members.

The purpose is to provide a headlight which is better adapted for use on locomotives of the size and style now employed. In my companion application filed April 1, 1911, Serial Number 618,475, of which the present case is a division, I set out certain improvements in the construction and arrangement of the lamp and its associated parts. This application covers a casing of particular construction to completely meet the requirement.

As locomotives were formerly constructed the headlight was often carried on the top portion of the front end of the boiler ahead of the smokestack where it could be easily and safely reached at front or side, or in some equally convenient place. As such boilers are now of greater diameter and of such height that a headlight cannot be carried on top of the boiler and the engine pass under bridges and through tunnels, it necessitates placing the headlight on the front end of the boiler, the base of the headlight being below the top of the boiler. In such location of the headlight it cannot be reached without great danger and difficulty. The same conditions exist in a headlight case having a door hinged in the front of the casing. In such a place the headlight is not easily reached for such attention as it may need and this necessitates removing the interior from the case for the purpose of trimming and lighting the burner. Therefore I devised the lamp shown in the companion case which can be easily taken care of, and in this application show a case whereby the interior parts can be more easily reached.

The fundamental purpose is to provide a case with a door which can, so to speak, be swung or folded back and away from the interior parts so that the latter, it might be said, are projected into the immediate reach of the hand. I am aware that cases of various styles have been devised which have openings closed by a door or sliding cover. But the location of the burner in the case is so far from the opening that it is difficult and inconvenient for the hand to reach and tend the lamp. In such cases it is necessary partially to withdraw the interior parts to light the burner, and it is necessary to reach in at the front end of the reflector, which overhangs the front of the boiler a considerable distance. No such casing opens up the entire interior immediately and closely before the eyes and hands. It is, in short, most desirable to have the entire construction such that the hand may reach in for adjustment of the wick or such small attention or that a substantial part of the case may be folded back to put the lamp and all its parts in easy reach when special attention is needed.

Figure 1 of the drawings is a front view of the headlight with the door open, and Fig. 2 is a side view, also with the door open.

The form of the case is preferably cylindrical from front to rear, but is not necessarily so. It is preferably made of three pieces which reduces the wear of jarring and adds strength.

A is part of the cylinder wall extending from a little beyond the vertical middle line at the top to substantially such line at the bottom, thus forming a little more than one-half the side-wall of the case. B is the back. C is the front with a projection or glass-holder D. H is the lower portion of the case-chimney. These parts I propose to make integral as by one casting or by welding the parts together or the like. E is the reflector. The other portion of the cylinder is shown at G and is hinged to A, at $g, g$, to be swung up, its free edge passing under the overhanging drip, $a$, and resting on inner flange $b$. Its edges shut against the edges $c, c$, of the front and back, which form jambs. It is secured in closed posibearing on said collar to maintain said valve seated, said collar coacting with said projection to limit the movement of said valve from its seat, an annular flange on the larger end of said valve, and a ring having a beveled face adapted to seat on the beveled portion of the wall of the opening in said head interposed between the latter and said annular flange, substantially as and for the purpose specified.

4. A hose coupling comprising two opposed members, a lip and a wing on each thereof, the lip of each adapted to engage the wing of the other to maintain said members in coupled relation, a valve in each of said members controlling communication between the same, a segmental flange on each of said valves terminating at its ends in projections between which the lip of the other member is adapted to be received, whereby relative rotary movement of said members is transmitted to said valves to open and close the same, said segmental flange of each valve adapted to pass underneath the wing of its carrying member when said valve is opened, a segmental lip on each of said members forming a guard for said segmental flange of said valve when the latter is open, the ends of the said segmental lips of companion members meeting when said members are moved into relative coupled positions, and a projection flush with one end of said lip and adapted to engage one of said projections on said segmental flange to turn said valve when the said members are moved into coupled position, substantially as and for the purpose described.

5. A hose coupling comprising two opposed members, a valve in each controlling communication between the same, projections on each of said members engaging similar projections on the other thereof to hold the same in coupled relation, projections on each of said valves adapted to be engaged by one of said projections of the other member to impart movement to said valve to open and close the same as said members are manually coupled and uncoupled respectively, and a projection on each of said members adapted to engage one of the projections of the valve of the other member to close the latter as said members are moved into coupled relation, whereby when the first-named valve-actuating projection of either member should be broken, opening of the valve in coupling said members will be assured.

6. A hose coupling comprising two opposed members, a lip and a wing on each thereof, the lip of each adapted to engage the wing of the other to maintain said members in coupled relation, a valve in each of said members controlling communication between the same, a segmental flange on each of said valves terminating at its ends in projections between which the lip of the other member is adapted to be received, whereby relative rotary movement of said members is transmitted to said valves to open and close the same, said segmental flange of each valve adapted to pass underneath the wing of its carrying member when said valve is opened, one of said projections on said valve adapted to be engaged by the lip of the other member being adapted to pass underneath the wing of its carrying member when said valve is turned in a direction to open the same, said projection so disposed relatively to the ridge of said wing as to prevent its engagement with the lip of the other member when said valve is partially open.

In testimony whereof I have signed my name in presence of two subscribing witnesses.

OLIVER P. WILHELM.

Witnesses:
RUDOLPH WM. LOTZ,
LANE WILHELM.